United States Patent
Ammann et al.

(10) Patent No.: US 9,570,877 B1
(45) Date of Patent: Feb. 14, 2017

(54) GAIN CONTROL FOR ARBITRARY TRIGGERING OF SHORT PULSE LASERS

(71) Applicant: Lumentum Operations LLC, Milpitas, CA (US)

(72) Inventors: Hubert Ammann, Zürich (CH); Marco Benetti, Zürich (CH)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 14/986,163

(22) Filed: Dec. 31, 2015

(51) Int. Cl.
  *H01S 3/10* (2006.01)
  *H01S 3/094* (2006.01)
  *H01S 3/23* (2006.01)
  *H01S 3/0941* (2006.01)
  *H01S 3/11* (2006.01)
  *H01S 3/00* (2006.01)

(52) U.S. Cl.
  CPC .......... *H01S 3/0941* (2013.01); *H01S 3/0092* (2013.01); *H01S 3/10015* (2013.01); *H01S 3/11* (2013.01); *H01S 3/235* (2013.01); *H01S 3/2308* (2013.01); *H01S 3/2325* (2013.01)

(58) Field of Classification Search
  CPC  H01S 3/0941; H01S 3/10007; H01S 3/10015; H01S 3/11; H01S 3/10046
  See application file for complete search history.

(56) References Cited

U.S. PATENT DOCUMENTS

| 5,812,569 | A  | * | 9/1998  | Walker ............ H01S 3/11 372/10 |
| 7,313,155 | B1 | * | 12/2007 | Mu ................ A61B 18/20 372/10 |
| 7,386,019 | B2 |   | 6/2008  | Klimov et al. |
| 7,692,854 | B2 |   | 4/2010  | Clubley et al. |
| 8,149,886 | B2 |   | 4/2012  | Kopf et al. |
| 8,995,052 | B1 |   | 3/2015  | Knappe et al. |
| 2008/0175287 | A1 | * | 7/2008 | Nakai ............ H01S 3/2308 372/30 |

FOREIGN PATENT DOCUMENTS

| DE | 102008003575 A1 | 7/2009 |
| EP | 1775806 A1 | 4/2007 |

* cited by examiner

*Primary Examiner* — Eric Bolda
(74) *Attorney, Agent, or Firm* — Harrity & Harrity, LLP

(57) ABSTRACT

A device may include a transient optical amplifier having stored energy associated with a lower boundary and an upper boundary of a dynamic equilibrium, and a target level defining stored energy for amplifying a high energy input pulse to a higher energy output pulse. The device may include a pump to increase the amplifier's stored energy, and a source to pass low energy control pulses or the high energy input pulse to the amplifier. The device may include a controller configured to maintain the amplifier's stored energy in the dynamic equilibrium by requesting low energy control pulses for the amplifier at a high repetition frequency. The controller may wait to receive a trigger. Based on receiving the trigger, the device may stop passing low energy control pulses to the amplifier, and may pass the high energy input pulse to the amplifier when the amplifier's stored energy reaches the target level.

33 Claims, 11 Drawing Sheets

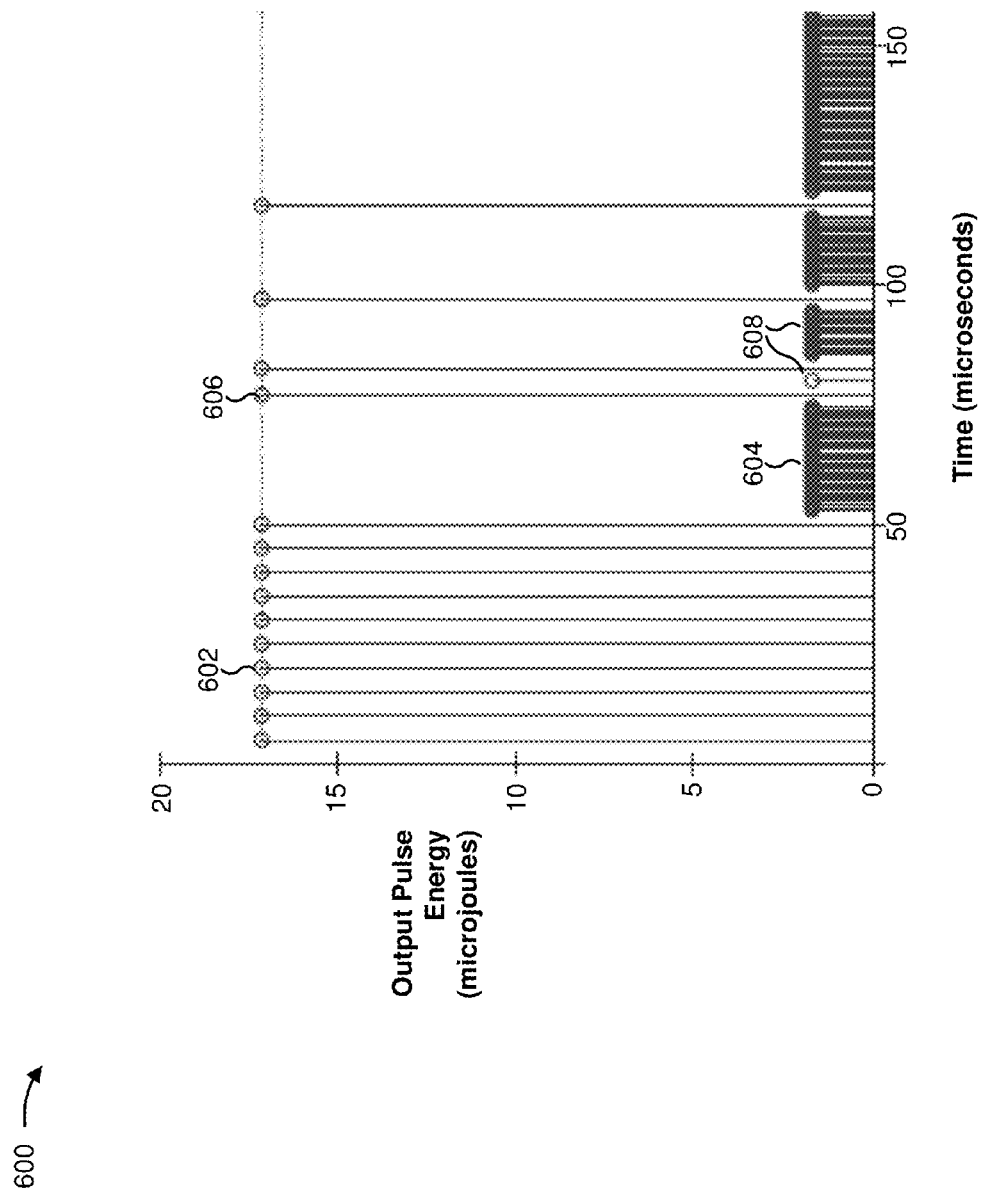

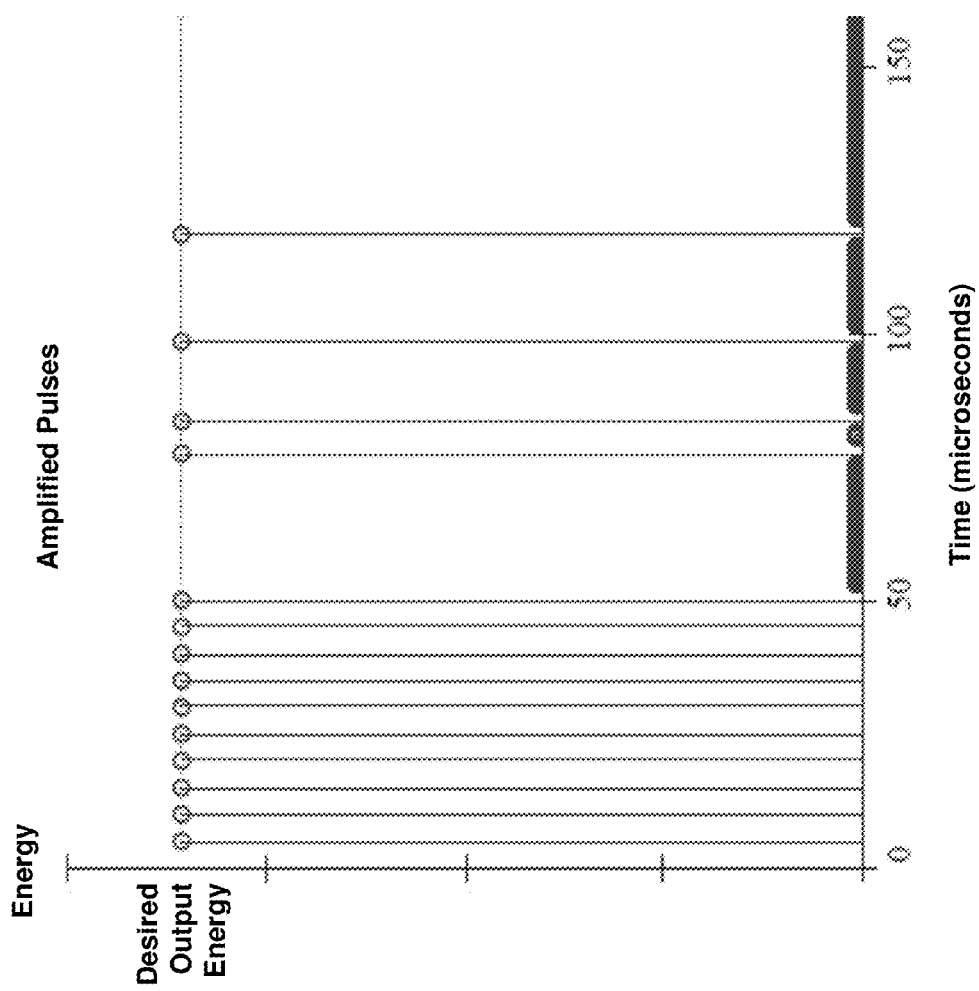

GAIN CONTROL FOR ARBITRARY TRIGGERING OF SHORT PULSE LASERS

TECHNICAL FIELD

The present disclosure relates to laser systems and methods of operating laser systems. More particularly, the present disclosure relates to methods and systems for regulating amplification of arbitrarily timed short laser pulses.

BACKGROUND

Short pulse laser systems generate optical pulses having sub-microsecond pulse width and sub-millisecond temporal spacing. As used herein, a short pulse of light is an electromagnetic pulse whose time duration is less than a microsecond ($10^{-6}$ seconds). Short pulse laser systems include ultrashort pulse laser systems (or conversely ultrafast laser systems) such as nanosecond, picosecond and femtosecond laser systems and other laser systems that can produce amplified optical pulses with sub-microsecond pulse width and sub-millisecond temporal resolution.

In conventional short pulse laser systems, high energy pulses are produced at a constant frequency and constant energy. Changing the time between pulses in such lasers can produce significant differences in the energy of each pulse with the potential for damage to the laser or the object to which the pulses are applied. There is a need for short pulsed lasers that can be triggered at any arbitrary time to provide a short duration pulse while controlling the energy of each triggered optical pulse. Such a laser would be advantageous for micromachining and potentially in other fields (e.g., ophthalmology, biomedical imaging, ultrafast spectroscopy, ultra-high-speed optical networks, reaction triggering, femtochemistry, etc.).

Taking conventional ultrafast laser micromachining as just one example, an optical beam is moved on a workpiece to apply the beam in a specific pattern. The beam can be moved, the workpiece can be moved, or both can be moved to trace the pattern. In order to maximize the processing speed, this movement should be as fast as possible; however, the speed is limited by the requirements on the accuracy of the movement. The movement can be very fast for straight lines, but may need to be very slow for small or complex features. The transitions between fast and slow movement occur dynamically, depending on the complexity of the pattern being traced.

When micromachining with ultrafast lasers, the optical beam being applied to the workpiece comprises nanosecond to femtosecond duration optical pulses with a pulse repetition frequency (PRF) in the range of kHz to MHz. Ideally, the energy of each pulse is kept constant and the pulses are evenly spaced in physical location on the workpiece. The spacing of pulses on the workpiece is proportional to the scanning speed (the relative speed between the optical beam and the workpiece) and the time between optical pulses (or inversely, the pulse repetition frequency (PRF) of the optical beam). Because the scanning speed dynamically changes, the time between optical pulses must also dynamically change to keep spacing of pulses constant on the workpiece. Unfortunately, dynamically changing PRF of a conventional amplified ultrafast laser will change the energy of the output optical pulses. In FIG. 1, the solid line is the amplifier's (e.g., the amplifier of a conventional ultrafast laser) stored energy, the input pulses are represented by the filled circles, and the output pulses are represented by the hollow circles. The relative energy level of a pulse is represented by the diameter of its solid or hollow circle.

FIG. 1 graphs the stored energy of an amplifier of a conventional ultrafast laser (such as an ultrafast laser according to U.S. Pat. No. 7,386,019 "Light pulse generating apparatus and method" published Jun. 10, 2008 incorporated herein by reference in its entirety). The solid line represents the amplifier's stored energy over time. The solid circles on the graph represent input pulses entering the amplifier where the size of the solid circle represents the energy of the input pulse. The outlined circles represent output pulses, concentric with their corresponding input pulse, and the size of the hollow circle represents the energy of the output pulse. In the example of FIG. 1, the energy of all input pulses remains the same. Conventionally, and as illustrated for the first three input pulses, the temporal spacing is fixed based on a pulse repetition frequency of a source (e.g., a short pulse laser source, etc.) providing the pulses to the amplifier. For the first three pulses, there is fixed temporal spacing, the stored energy is in dynamic equilibrium, returning to a target level at the same time the next pulse arrives, and the output pulses accordingly have a constant energy level. When the temporal spacing between pulses changes, the amplifier's dynamic equilibrium is broken. Where the time between pulses increases, the amplifier overshoots the target and the energy of the next pulse can be so great that the pulse can damage the laser, the workpiece or other things. When the time between pulses decreases, the amplifier cannot replenish its stored energy to the target level and the energy of the next pulse may be insufficient to perform its task. If the timing of even one pulse is sufficiently off, the amplifier can take a significant amount of time to re-establish its equilibrium. These problems compound as more pulses deviate from a constant temporal spacing, or a constant pulse repetition frequency. Further problems occur if the energy of each input pulse is not held constant.

The lack of arbitrarily timed, or arbitrarily triggered pulsed lasers that keep pulse energy fluctuations sufficiently small, results in compromising on either throughput, quality or system complexity. In many of today's ultrafast laser applications and market areas, this is a very significant limitation. Accordingly, it would be advantageous to have a pulsed laser that can be triggered at arbitrary times, with high temporal resolution, to provide a short duration optical pulse in association with each trigger while being able to control the energy of all the optical pulses.

SUMMARY

In some possible implementations, a method may include continuously pumping a transient optical amplifier thereby increasing the amplifier's stored energy. The amplifier's stored energy may be associated with three increasing energy levels: a lower boundary of a dynamic equilibrium; an upper boundary of the dynamic equilibrium; and a target level defining stored energy for amplifying a high energy input pulse to a higher energy output pulse. The method may include maintaining the amplifier's stored energy in the dynamic equilibrium by passing low energy control pulses from a source to the amplifier at a high repetition frequency. The method may include, based on receiving a trigger, stopping passing low energy control pulses to the amplifier. The method may include waiting for the pumping to increase the amplifier's stored energy to the target level. The method may include passing the high energy input pulse to the amplifier. The method may include amplifying the high energy input pulse to a higher energy output pulse thereby decreasing the amplifier's stored energy to a depleted level, below the target level. The method may include outputting the higher energy output pulse.

In some possible implementations, the source may include a short pulse laser source having a pulse repetition frequency greater than 5 megahertz (MHz). The source may include a pulse picker, optically connected to the short pulse laser source, to control emission and energy of laser pulses from the short pulse laser source.

In some possible implementations, the method, when controlling the emission and energy of the laser pulses, may include passing, partially passing or blocking, by the pulse picker, laser pulses from the short pulse laser source.

In some possible implementations, the method, when stopping passing the low energy control pulses, may include blocking, by the pulse picker, laser pulses from the short pulse laser source.

In some possible implementations, at least one of the short pulse laser source or the pulse picker may provide sub-microsecond response time.

In some possible implementations, the low energy control pulses, the high energy input pulse, and the higher energy output pulse may have pulse widths less than one microsecond.

In some possible implementations, the depleted level may be lower than the lower boundary of the dynamic equilibrium.

In some possible implementations, a center energy level of the dynamic equilibrium may be closer to a center energy level of the target level and the depleted level than to the target level or to the depleted level.

In some possible implementations, a time delay between receiving the trigger and outputting the higher energy output pulse may be between approximately 5 nanoseconds and approximately 100 nanoseconds.

In some possible implementations, a device may include a transient optical amplifier having stored energy associated with three increasing energy levels: a lower boundary of a dynamic equilibrium; an upper boundary of the dynamic equilibrium; and a target level defining stored energy for amplifying a high energy input pulse to a higher energy output pulse. The device may include a pump to increase the amplifier's stored energy. The device may include a source to pass low energy control pulses or the high energy input pulse to the amplifier. The device may include a controller configured to maintain the amplifier's stored energy in the dynamic equilibrium by requesting the source pass low energy control pulses to the amplifier at a high repetition frequency. The controller may be configured to wait to receive a trigger. The controller may be configured to, based on receiving the trigger, stop passing low energy control pulses to the amplifier, and request the source pass the high energy input pulse to the amplifier when the amplifier's stored energy reaches the target level.

In some possible implementations, the source may comprise a laser diode.

In some possible implementations, the controller, when stopping passing the low energy control pulses, is configured to control the laser diode to prevent emission of pulses by the laser diode.

In some possible implementations, the source may comprise a continuous wave laser providing the low energy control pulses as a continuous wave low average power control beam and a second laser providing the high energy input pulse.

In some possible implementations, the amplifier's stored energy may be depleted to a depleted level by amplification of the high energy input pulse. The high repetition frequency may be greater than a repetition frequency that would maintain the amplifier's stored energy in equilibrium between the target level and the depleted level without the low energy control pulses.

In some possible implementations, a difference between the upper boundary and the lower boundary may be less than or equal to 60 percent of a difference between the target level and the depleted level.

In some possible implementations, a difference between the upper boundary and the lower boundary may be less than or equal to 20 percent of a difference between the target level and the depleted level.

In some possible implementations, the device may output the higher energy output pulse. In such implementations, decreasing the difference between the upper boundary and the lower boundary may decrease at least one of: a timing jitter between a time of outputting the higher energy output pulse and a time of receiving the trigger, or an energy jitter between a desired energy level and an energy level of the higher energy output pulse.

In some possible implementations, the amplifier of the device may include at least one of: one or more single pass amplifiers, one or more multi-pass amplifiers, or a combination of one or more single pass amplifiers and one or more multi-pass amplifiers.

In some possible implementations, the controller of the device may be configured to determine that the trigger indicates to provide a series of pulses in a burst. The controller of the device may be figured to request, when the amplifier's stored energy reaches the target level, the high energy input pulse as the series of pulses in a burst.

In some possible implementations, the device may include an output control, after the amplifier, to pass, block, or reduce energy levels of amplified low energy control pulses and higher energy output pulses before output.

In some possible implementations, the controller of the device may be configured to request the output control to block pulses when the controller is requesting low energy pulses from the source.

In some possible implementations, the output control may include a pulse picker or a pulse-on-demand.

In some possible implementations, the device may include a nonlinear wavelength converter after the amplifier.

In some possible implementations, the device may receive multiple triggers and may output multiple higher energy output pulses corresponding to the multiple triggers. In such implementations, a timing jitter and an energy jitter of the multiple higher energy output pulses corresponding to the multiple triggers may be less than approximately 1 microsecond and 5%, respectively.

In some possible implementations, a short pulse laser gain regulation method may include pumping, by a laser system, a transient optical amplifier of the laser system, thereby increasing the amplifier's stored energy. The method may include waiting, by the laser system, to receive a trigger. While the amplifier's stored energy is below a holding energy level, the method may include preventing, by the laser system, emission of laser pulses from a pulse source of the laser system into the amplifier. When the amplifier's stored energy reaches the holding energy level and the trigger has not been received, the method may include emitting, by the laser system, low energy control pulses from the pulse source into the amplifier. Each low energy pulse may decrease some of the amplifier's stored energy, counteracting the pumping, thereby maintaining the amplifier's stored energy in a dynamic equilibrium near and below the holding energy level. When the trigger is received, the method may include preventing, by the laser system, emission of laser pulses from the pulse source into the amplifier until the amplifier's stored energy reaches a target energy level higher than the holding energy level, then emitting a high energy input pulse from the pulse source into the amplifier, amplifying the high energy input pulse in the amplifier to a higher energy output pulse. The method may include outputting, by the laser system, the higher energy output pulse.

In some possible implementations, the trigger may be received externally from or generated internally to a controller of the laser system at any arbitrary time.

In some possible implementations, prior to amplification, each low energy control pulse, of the low energy control pulses, may have 25%, or respectively less, energy than the high energy input pulse. In such implementations, a repetition rate of the low energy control pulses may be 4x, or respectively more, than a pulse repetition frequency (PRF) that would maintain the amplifier's stored energy in equilibrium between the target level and a depleted level without the low energy control pulses. The amplifier's stored energy may be depleted to the depleted level by amplification of the high energy input pulse.

In some possible implementations, prior to amplification, each low energy control pulse, of the low energy control pulses, may comprise between approximately 0.1% and approximately 40% of the energy of the high energy input pulse.

In some possible implementations, each low energy control pulse, of the low energy control pulses, may comprise between approximately 0.001 nanojoules and approximately 100 nanojoules of energy.

In some possible implementations, the low energy control pulses may have the same optical properties as the high energy input pulse except for energy and timing.

In some possible implementations, the high energy input pulse may travel through a gain medium of the amplifier multiple times before being output as the higher energy output pulse.

In some possible implementations, a time delay between receiving the trigger and outputting the higher output energy pulse may be less than approximately 1 microsecond. In some possible implementations, the laser system may include one of a nanosecond laser, a picosecond laser, a femtosecond laser, a master oscillator power amplifier laser, or a regenerative amplifier laser.

Each of the implementations described in this section, the sections below, and the figures may be applied singularly and/or in combination with any of the other implementations described in this section, the sections below, and the figures.

BRIEF DESCRIPTION OF THE DRAWINGS

FIG. 6A is a graph showing the energy of a first sequence of output pulses from a short pulse laser system according to FIG. 4;

FIG. 6C is a graph showing the energy of a second sequence of output pulses from a short pulse laser system according to FIG. 4;

DETAILED DESCRIPTION

The following detailed description refers to the accompanying drawings. The same reference numbers in different drawings may identify the same or similar elements.

Exemplary methods and devices to control the gain of an amplifier with great precision and accuracy in terms of both time and energy resolution are disclosed. In particular, transient optical amplifier regulation enables arbitrary, not necessarily fixed repetition rate, triggering of pulsed, constant energy amplified laser light. Transient optical amplifier regulation eliminates pulse energy fluctuations usually associated with irregular external triggers of short-pulse lasers. Despite the random trigger timing, sub-microsecond timing jitter and/or less than 5% energy jitter may be achieved in some embodiments. Implementing exemplary methods and devices can be simple, robust and cost-effective. Exemplary methods and devices may lead to increased throughput and/or the process quality in many short pulse laser applications. This in turn lowers the economical hurdles for the usage of such lasers in industrial applications.

Figure 1:
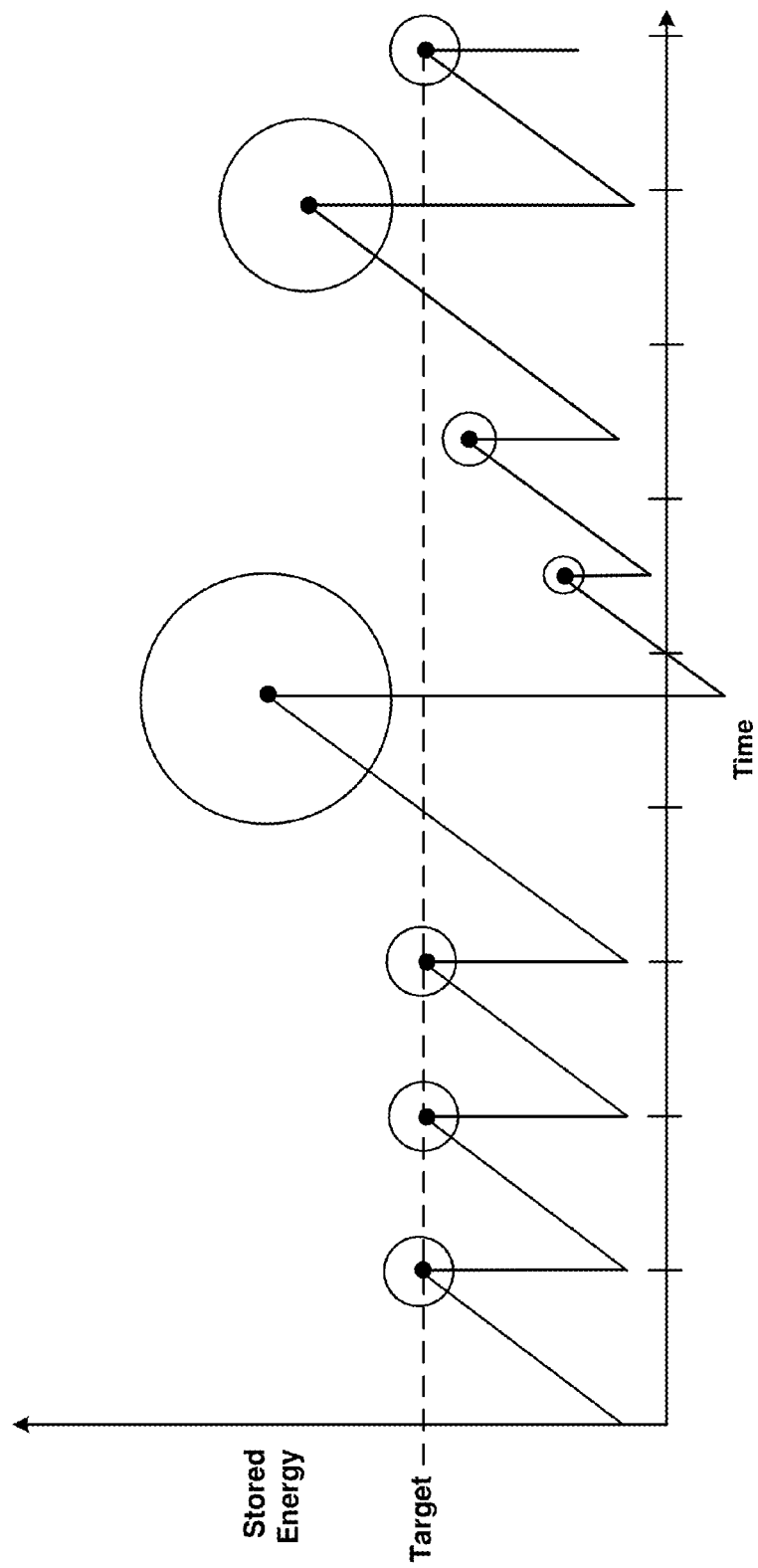
FIG. 1 is an example graph, relating to a short pulse laser system, illustrating the effects of constant and variable pulse timing.
Figure 2:
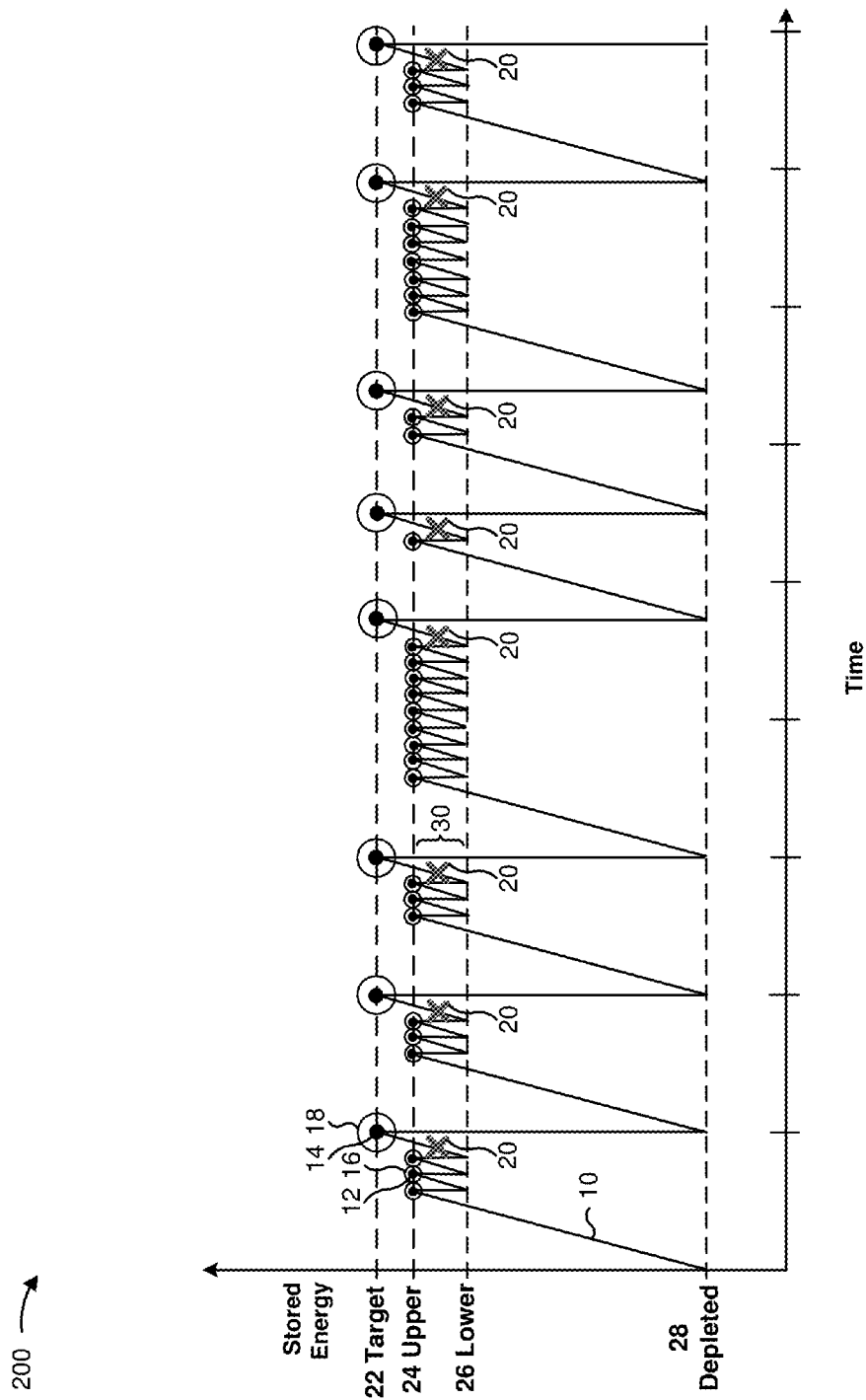
FIG. 2 is a diagram of an example implementation described herein for regulating amplification of arbitrarily timed laser pulses.

Referring to FIG. 2, the stored energy of a continuously pumped transient optical amplifier operated according to an embodiment of the present disclosure is graphed against time. This graph is not to scale, but provides general relationships between stored energy, time and pulses of laser light. In FIG. 2, the amplifier's stored energy 10 is represented by the solid line in the graph. Each circle 12, 14, 16, 18 represents a pulse of laser light. The relative size of each circle represents the relative energy level of that pulse. The small solid circles represent low energy control pulses 12 entering the amplifier. The larger solid circles represent high energy input pulses 14 entering the amplifier. The small outline circles represent amplified low energy control pulses 16 while the large outline circles represent higher energy output pulses 18. The crosses represent receiving a trigger 20 to output a higher energy output pulse 18. The four dashed lines represents a target energy level 22 at which a high energy input pulse 14 can be amplified to the desired energy level of a higher energy output pulse 18, an upper boundary 24 of a dynamic equilibrium 30 (e.g., a holding energy level), a lower boundary 26 of the dynamic equilibrium 30 and a depleted energy level 28 of the amplifier after amplifying a high energy input pulse 14 to a higher energy output pulse 18. As is illustrated in FIGS. 1 and 2, and as is well known in the art, the energy transfer from an input pulse to an output pulse is virtually instantaneous.

At a high level, the graph in FIG. 2 illustrates how embodiments of the present disclosure maintain an amplifier's stored energy in a dynamic equilibrium, oscillating between the upper boundary 24 and the lower boundary 26, below the target level 22 while waiting to receive a trigger 20. When the amplifier's stored energy 10 reaches the upper boundary 24, a low energy control pulse 12 is passed into the amplifier depleting the amplifier stored energy to the lower boundary 26. Passing low energy control pulses 12 into the amplifier can continue indefinitely, while waiting for a trigger 20. In some embodiments, passing low energy control pulses 12 occurs at a high pulse repetition frequency (PRF). When a trigger 20 is received, the amplifier's stored energy 10 is allowed to increase to the target level 22 and when it reaches that level, a high energy input pulse 14 is released into the amplifier, amplified into a higher energy output pulse 18 and ultimately output.

Comparing FIGS. 1 and 2, it can be seen that the input pulses of FIG. 1 correspond temporally and in energy level to the high energy input pulses 14 of FIG. 2; however, the output pulses of FIG. 1 have widely varying energy levels when the time spacing of input pulses becomes irregular while the higher energy output pulses 18 of FIG. 2 are constant regardless of the time between high energy input pulses 14.

Figure 3:
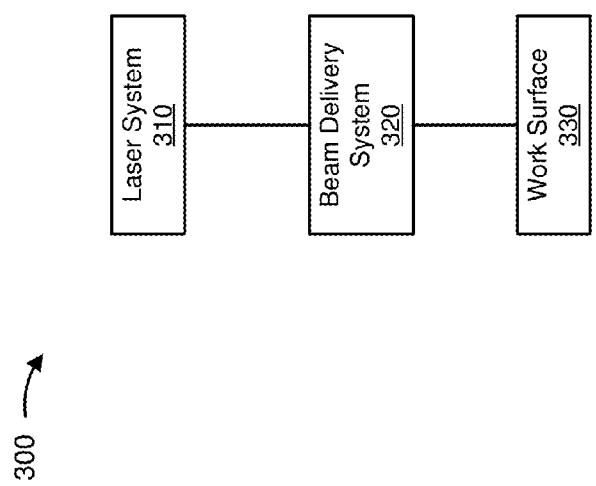
FIG. 3 is a diagram of an example environment in which systems and/or methods, described herein, may be implemented.

FIG. 3 is a diagram of an example environment 300 in which systems and/or methods, described herein, may be implemented. As shown in FIG. 3, environment 300 may include a laser system 310, a beam delivery system 320, and a work surface 330. Devices of environment 300 may interconnect via wired connections, wireless connections, or a combination of wired and wireless connections.

Laser system 310 may include one or more devices capable of outputting a pulsed optical beam. For example, laser system 310 may include a short pulse laser system (e.g., a picosecond pulsed laser system, a nanosecond pulsed laser system, a femtosecond pulsed laser system, etc.) or the like. Laser system 310 may output a pulsed optical beam (e.g., for micromachining, for cold ablation, for cutting, for drilling, etc. of a workpiece on the work surface 330).

Beam delivery system 320 may include one or more components that may modify an optical beam output by laser system 310. For example, beam delivery system 320 may include coated laser optics, coated and/or uncoated substrates (e.g., a Plano substrate, a curved substrate, a lens, etc.), a retardation plate, a polarizer, a beam guide, a beam moving mechanism (e.g., a galvanometer-based optical scanning system, a polygon scanning system, an acousto-optical scanner, etc.), a motorized staging system, a beam delivery system control component, or the like.

Work surface 330 may include a surface to receive pulsed optical beams from laser system 310. For example, work surface 330 may include a surface on which to mount a workpiece, or the like. In some implementations, work surface 330 may move laterally with respect to laser system 310 and/or with respect to beam delivery system 320 (e.g., based on a motorized staging system of work surface 330, etc.). Additionally, or alternatively, an optical beam outputted by laser system 310 may move laterally with respect to work surface 330 (e.g., based on a beam moving mechanism of beam delivery system 320, etc.).

Figure 4:
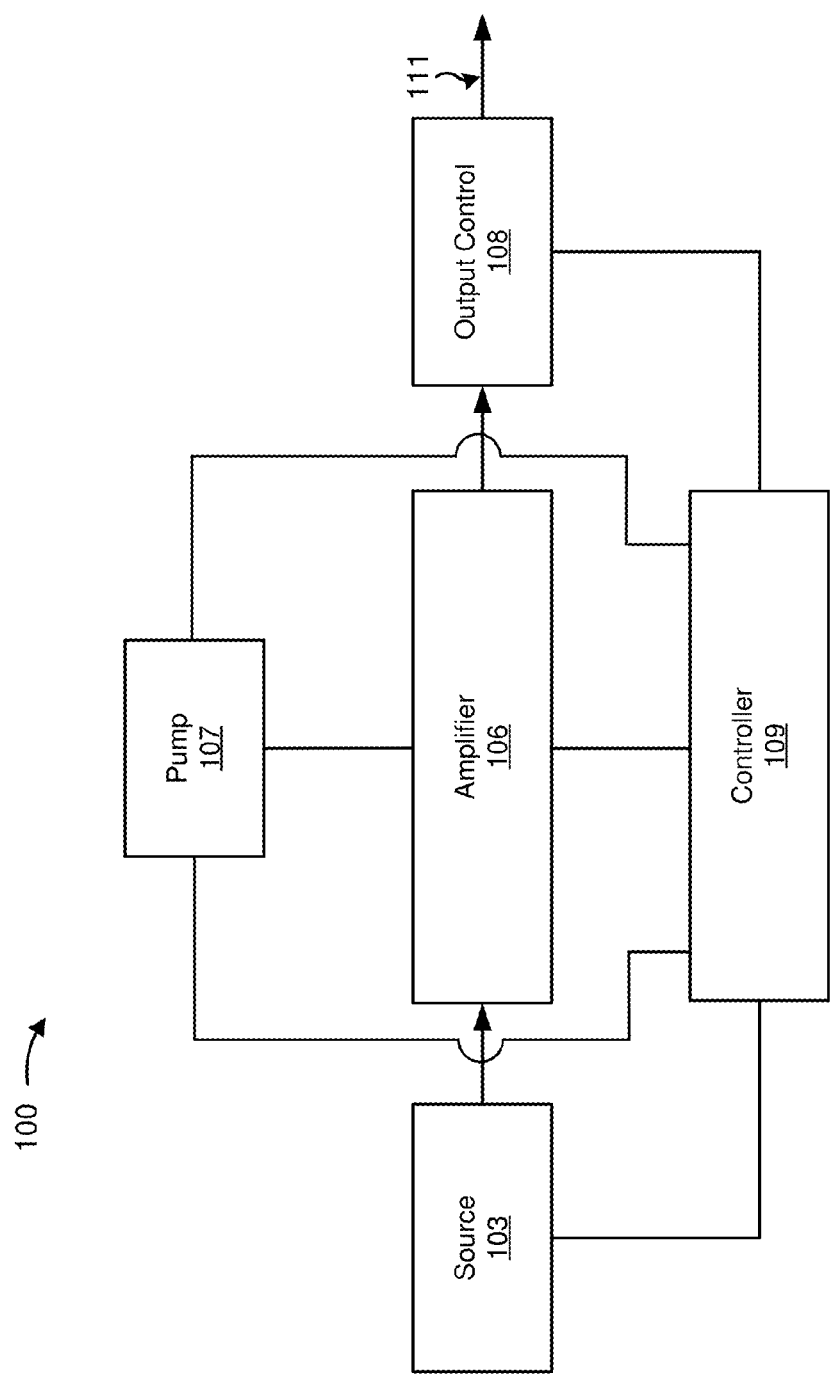
FIG. 4 is a diagram of an example laser in which systems and/or methods, described herein, may be implemented.

The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300. FIG. 4 illustrates a laser 100 comprising a source 103, an amplifier 106 optically connected to the source, a pump 107 connected to the amplifier, an optional output control 108 optically connected to the amplifier 106 and a controller 109 connected to the source 103 and optionally connected to the amplifier 106, pump 107 and/or the output control 108. The source 103, amplifier 106 and output control 108 are optically connected along an optical path 111. In some implementations, laser 100 may correspond to laser system 310.

The laser 100 outputs laser pulses having pulse widths anywhere in the range of microseconds, nanoseconds, picoseconds and femtoseconds. The output laser pulses have a temporal spacing anywhere in the ranges of seconds, milliseconds, microseconds, sub-microseconds, or the like. Conversely, the output laser pulses may have maximum pulse repetition rates in the hertz (Hz) range, the kilohertz (kHz) range, the megahertz (MHz) range, or the like; however, it is not necessary for the output laser pulses to adhere to a repetition frequency. Rather, the laser pulses can be output at any arbitrary time. Whether or not the output laser pulses have a fixed repetition rate or are arbitrarily time spaced, the laser 100, provides a constant, configurable, energy level to each output pulse. The laser pulses may have energy anywhere in the range of, for example, sub-millijoules to joules. For example, as described in connection with FIG. 6A, below, the laser pulses may have energy of approximately 17 microjoules. As another example, in some embodiments, the laser pulses may have energy values in the range of approximately 50 millijoules to approximately 200 millijoules. As yet another example, in some embodiments, the laser pulses may have energy in the sub-millijoule range.

The laser 100 can be implemented in a variety of different laser configurations including master oscillator power amplifier (MOPA), regenerative amplifier or other configurations well known to the skilled person. MOPA and regenerative amplifier configurations will be described in greater detail below; however other configurations are equally possible and have been omitted for brevity alone.

The source 103 provides pulses of laser light to the amplifier 106 under command of the controller 109. The source 103 is configured to output short (or ultrashort) laser pulses at different, configurable energy levels and with arbitrary timing. Arbitrary timing includes any timing including random timing of pulses, on-demand triggering of pulses, pre-set patterns of pulses and fixed repetition rate pulses. In some embodiments, source 103 may comprise a laser diode. In some embodiments, source 103 may comprise a low energy, high PRF ultrafast seed oscillator optically coupled to a pulse picker. As one possible example, source 103 may provide laser pulses at a frequency greater than or equal to approximately 5 megahertz (MHz). In alternative embodiments, the source 103 may include a continuous wave laser for providing a low average power optical beam instead of low energy control pulses and a second laser may be used to provide high energy pulses. By controlling the pulses and optical beam from the source 103, before the amplifier 106, it is possible to achieve greater regulation of the amplifier with greater precision. In some implementations (e.g., implementations where the source 103 includes a pulse picker), the source 103 may be capable of passing an optical signal at a particular efficiency (e.g., 0.01%, 0.1%, 1%, 10%, 50%, 90%, etc.) with less than 5% error. In some implementations, the source 103 may be capable of passing optical pulses with different energies (e.g., energies in a range of an order of magnitude, energies in a range of two orders of magnitude, etc.) with a particular level of error (e.g., a sub-5% relative error, etc.). In some implementations, the source 103 may be capable of passing an optical signal at a variable efficiency that can be changed, in some implementations, with a particular response time (for example, microsecond or nanosecond response time). In some implementations, the source 103 may be capable of passing an optical signal at dynamically variable power/energy levels with a particular response time.

The amplifier 106 receives pulses from the source 103 and outputs amplified, that is, higher energy level, pulses. The amplifier 106 may comprise any transient regime optical amplifier known to the skilled person. Example amplifier types include rod amplifiers, slab amplifiers, disk amplifiers and fiber amplifiers. The amplifier 106 may comprise an amplifier and/or a series of multiple amplifiers. The amplifier 106 may be configured for multi-pass, single pass or a combination of any number of single pass and/or multi-pass amplifiers in series. For example, the amplifier may include one or more single pass amplifiers (e.g., in series), one or more multi-pass amplifiers (e.g., in series), and/or one or more single pass amplifiers and one or more multi-pass amplifiers in series. The amplifier 106 may output amplified pulses to an output control 108 or directly out of the laser 100. The amplifier 106 operates in the transient regime with continuous pumping, which provides a predictable increase of the amplifier's stored energy when no light from the source 103 is amplified. Amplifier 106 may include a gain medium (e.g., a fiber-based gain medium, a bulk gain medium, such as a rod, a slab, a disk, etc.), such as a laser crystal or laser glass (e.g., a neodymium-doped yttrium aluminum garnet (YAG), a ytterbium-doped tungstate crystal (e.g., a potassium gadolinium tungstate (KGW) crystal, a potassium yttrium tungstate (KYW) crystal), an erbium-doped YAG, a titanium-sapphire crystal, etc.), a ceramic gain medium, a composite gain medium, or the like.

The amplifier 106 has stored energy which represents the potential gain the amplifier 106 can provide to an optical pulse passing through the amplifier gain medium. Amplifying a pulse decreases the amplifier's stored energy and the amplifier's stored energy should be replenished to continue amplifying pulses to the same energy level.

The pump 107 connects to the amplifier 106 to increase the amplifier's stored energy. In some embodiments, the pump 107 electrically or optically connects to the amplifier 106 and provides a predictable rate of increase to the amplifier's stored energy. In some embodiments, the pump 107 provides continuous pumping constantly providing energy to increase or replenish the amplifier's store energy. The amplifier's gain medium may receive energy for amplification of optical signals from the pump 107 in a process referred to herein as pumping.

The optional output control 108 receives amplified laser pulses from the amplifier 106 and can be configured (e.g., by the controller 109) to block, pass or partially pass the pulses. An example output control 108 includes a pulse picker, a pulse-on-demand module that includes a pulse picker, or another type of output control. The output control 108 may also include a wavelength converter (e.g., a nonlinear wavelength converter) based on a nonlinear crystal material, a photonic crystal fiber, a gas, or the like. In such implementations, the additional output control elements may perform a frequency doubling process, a sum and difference frequency generation process, a Raman conversion process, a supercontinuum generation process, a high harmonic generation process, or the like. Partially passing a pulse reduces the energy of the pulse from its highest level (passing the pulse) to an intermediate level.

The controller 109 connects to and/or controls the source 103, and optionally connects to and/or controls to the amplifier 106, the pump 107 and the output control 108. The controller 109 coordinates regulating the amplifier's stored energy and outputting higher energy output pulses from the laser 100 in response to a request, or a trigger, for an output pulse. In example embodiments, the controller 109 regulates the amplifier's stored energy by balancing the amplifier's increasing stored energy from the pump 107 by depleting stored energy using low energy, high frequency pulses or other low average power light from the source 103. The controller 109 may be implemented in software and/or hardware. For example, the controller 109 may include a processor, such as a digital signal processor, a microprocessor, an integrated circuit (e.g., a photonic integrated circuit, an application-specific integrated circuit, etc.), a field-programmable gate array, or the like. Controller 109 may also include other components that interact with the processor, such as a memory device, a communication interface, an input component, and/or an output component. The memory device may store instructions or data used by the processor. The communication interface may permit the processor to communicate with other components of the laser system, to receive commands from external to the laser system, and/or to provide data external to the laser system. The controller 109 may include computer-readable instructions stored in a non-transient computer readable medium for execution by a general purpose computer, reconfigurable hardware (such as FPGAs), application specific hardware (such as ASICs) other electrical and combinations of these implementation technologies.

In one embodiment, the controller 109 regulates the amplifier 106 using pre-defined time delays and knowledge of the rate of increase of the amplifier's stored energy due to continuous pumping from the pump 107. After amplifying a high energy input pulse, the controller 109 does not pass low energy control pulses for a pre-defined time. The amplifier's stored energy, right after the amplification of a high energy input pulse, will decrease to the depleted level, so after the pre-defined time, the stored energy level will be known to be at the upper boundary. Once the controller 109 requests control pulses with a pre-defined PRF and energy, the amplifier's stored energy will remain in equilibrium between the upper and lower boundaries, so the controller 109 continues providing the control pulses until it receives a trigger. When the controller 109 receives a trigger, it waits until the time that it would generate the next control pulse. The waiting time may be any amount of time between zero and a time between control pulses, depending on the timing of receiving the trigger. This uncertainty will eventually introduce a time delay jitter of the time between the trigger and the higher energy output pulse. When the waiting time ends, instead of passing the next control pulse, the controller 109 stops the control pulses for a second pre-defined time interval. At this point, the controller 109 knows the amplifier's stored energy is at the upper boundary, thus the second time delay is pre-determined to allow the amplifier's stored energy to increase to the target level. After the second time interval, the controller 109 requests a high energy input pulse. The actions taken by the controller 109 can then be repeated for each arbitrarily timed trigger.

Thus, in this embodiment, the controller 109 controls amplification using two pre-defined time intervals: one for stopping, omitting, etc. control pulses after an output pulse is emitted, and the other for stopping, omitting, etc. control pulses after a trigger is received. In such an embodiment, there is a maximum repetition rate $PRF_{max}$ equivalent to the minimum time possible between triggered pulses. This is equivalent to the sum of the two pre-defined fixed time intervals. In some implementations, the controller 109 may be configured based on different $PRF_{max}$ values (e.g., based on programming the controller 109 with different time intervals for the different $PRF_{max}$ values.

The number and arrangement of devices and components shown in FIG. 4 is provided as an example. In practice, there may be additional devices/components, fewer devices/components, different devices/components, or differently arranged devices/components than those shown in FIG. 4.

Figure 5:
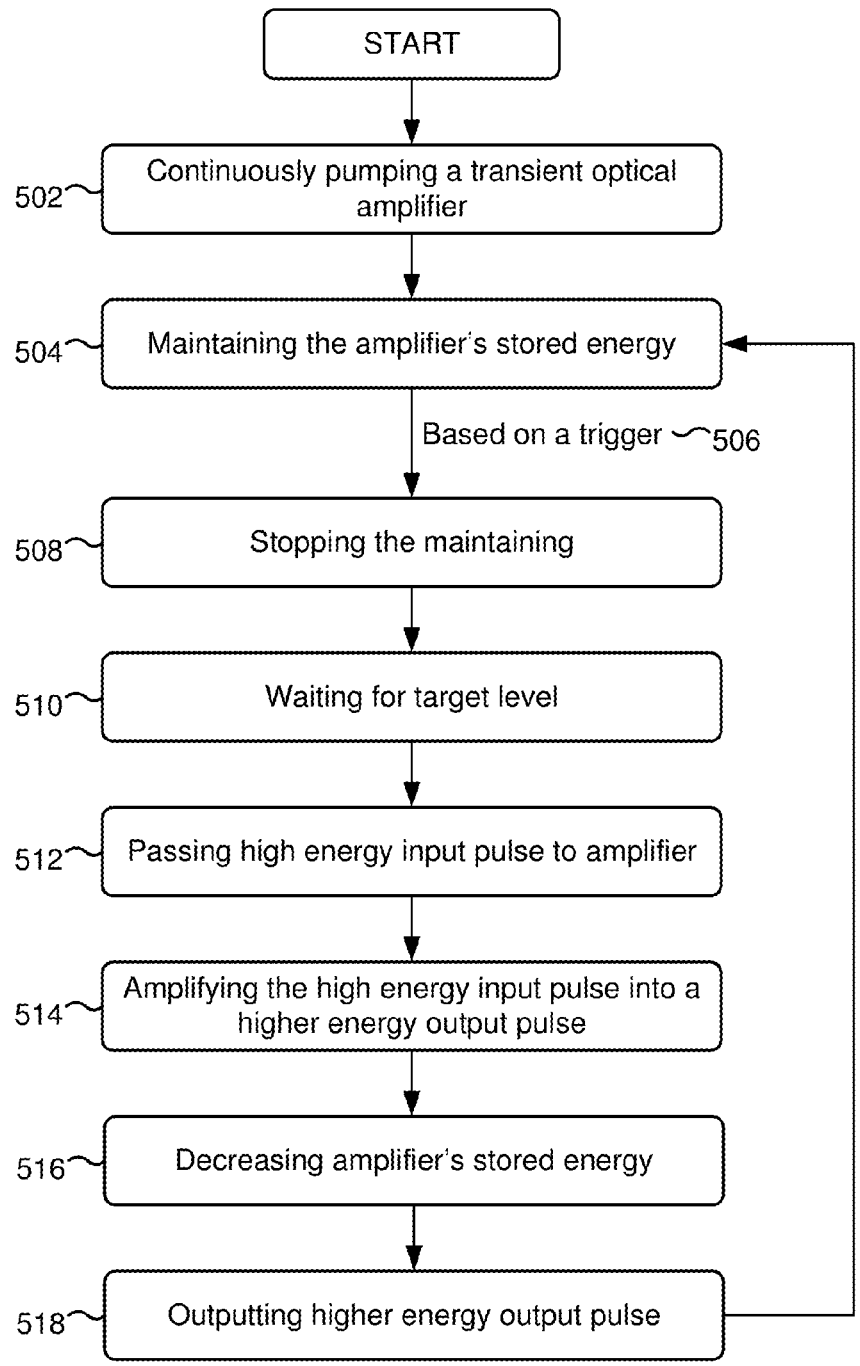
FIG. 5 is a flow chart of an example process for regulating stored energy for amplifying arbitrarily timed laser pulses.

FIG. 5 illustrates an example method 500 for regulating stored energy for amplifying arbitrarily-timed laser pulses. The method 500 may be implemented in a purpose-built laser such as laser 100, or in an existing laser that is capable of the operating parameters describe in method 500 and that can be suitably reconfigured, for example by providing downloadable computer or reprogrammable gate array instructions, non-transient computer readable media containing the like, or even replacement integrated circuits or other modules such as controller 109. In some implementations, one or more actions of method 500 may be performed by laser 100 or laser system 310. In some implementations, one or more process actions of FIG. 5 may be performed by another device or a group of devices separate from or including laser 100 or laser system 310, such as beam delivery system 320.

The method 500 commences by continuously pumping 502 a transient optical amplifier 106 thereby increasing the amplifier's stored energy 10. The amplifier's stored energy 10 is associated with three increasing energy levels: a lower boundary 26 of a dynamic equilibrium 30, an upper boundary 24 of the dynamic equilibrium 30 and a target level 22 defining stored energy for amplifying a high energy input pulse 14 into a higher energy output pulse 18. In some cases, a difference between the upper boundary 24 and the lower boundary 26 may be less than or equal to a particular value (e.g., 60%, 20%, etc.). Continuously pumping 502 can be achieved by a pump 107 by electrical, optical or other pumping means known in the art. The pumping is continuous in the sense that the pumping 502 provides a predictable rate of increase to the amplifier's stored energy 10 for an optical amplifier 106 operating in the transient regime.

While continuously pumping 502, the method 500 continues by maintaining 504 the amplifier's stored energy 10 in the dynamic equilibrium 30 by passing low energy control pulses 12 to the amplifier 106 at a high repetition frequency. Maintaining 504 the amplifier's stored energy 10 in the dynamic equilibrium 30 is achieved by allowing the amplifier's stored energy 10 to increase to the upper boundary 24 then passing a low energy control pulse 12 into the amplifier 106 and depleting the amplifier's stored energy 10 to the lower boundary 26 of the dynamic equilibrium 30. Another such pulse 12 is passed to the amplifier 106 when the amplifier's stored energy 10 returns (due to the continuous pumping 502) to the upper boundary 24 of the dynamic equilibrium 30. By matching the time between low energy control pulses 12 and the energy that the low energy control pulses extract from the amplifier 106 per pulse, the method 500 can maintain the stored energy of the amplifier 106 in the dynamic equilibrium 30 for any length of time. A higher energy control pulse will extract more energy from the amplifier 106 and consequently may be applied less frequently than a lower energy control pulse. On the other hand, a lower energy control pulse will extract less energy from the amplifier 106 and consequently may be applied more frequently than a higher energy control pulse. As the energy of the control pulses is lowered while the repetition rate of the control pulses is increased, the train of control pulses can be modelled, and indeed be replaced by, a continuous wave (cw) optical beam having the same average power as the train of control pulses.

To stabilize the stored energy of the amplifier 106, the input power of the control beam must be chosen such that the extracted power equals the stored energy increase, over time, provided by the continuous pumping. Using 1 milliwatt (mW) average power as an example, 0.05 nanojoule (nJ) pulses at 20 MHz PRF, 0.025 nJ pulses at 40 MHz and 0.005 nJ pulses at 200 MHz all achieve the same 1 mW average power. If the pulse energy continues to decrease and the PRF continues to increase, one arrives at a continuous wave beam having power of 1 mW. As the energy per pulse decreases and the PRF increases, the separation between the upper and lower boundaries of the dynamic equilibrium 30 also decreases and converges to a single amplifier stored energy level below the target level when the control pulses comprise a continuous wave optical beam. In some cases, a center energy level of the dynamic equilibrium 30 may be closer to a center energy level of the target level 22 and the depleted level 28 than to the target level 22 or the depleted level 28. The center energy level may simply be the average between the two different energy levels.

Maintaining 504 the amplifier's stored energy 10 in the dynamic equilibrium 30 below the target level 22 continues indefinitely while waiting for a trigger 20. A trigger 20 is a signal to the controller 109 that a higher energy output pulse 18 has been requested from the laser 100. Based on (e.g., in response to, based on receiving, based on generating, etc.) a trigger 506, maintaining the amplifier's stored energy 10 in the dynamic equilibrium 30 is stopped and a series of actions causes outputting 518 of a higher energy output pulse 18 from the laser 100 or laser system 310.

More specifically, the method 500 responds to a trigger 20 by stopping passing 508 low energy control pulses 12 to the amplifier 106 and waiting 510 for the pumping 502 to increase the amplifier's stored energy 10 to the target level 22. Stopping passing 508 includes blocking control pulses that are being emitted by a source 103 into the amplifier 106, ceasing emission of such pulses and instructing or requesting, by a controller 109 to a source 103 to block or cease such low energy control pulses 12. Stopping passing 508 may also include not instructing or requesting, by a controller 109 to a source 103 another low energy control pulse 12.

When the amplifier's stored energy 10 reaches the target level 22, the method 500 passes 512 a high energy input pulse 14 to the amplifier 106 causing the amplifier 106 to amplify 514 the high energy input pulse 14 into a higher energy output pulse 18 concurrently decreasing 516 the amplifier's stored energy 10 to a depleted level 28 below the target level 22 and then outputting 518 the higher energy output pulse 18 from the laser 100 or laser system 310. In FIG. 2, depleted level 28 is illustrated below the lower boundary 26; however, depending on the configuration of the laser 100 or laser system 310, depleted level 28 may be higher than the lower boundary 26 or higher than the upper boundary 24.

Passing 512 the high energy input pulse 14 to the amplifier 106 may include a controller 109 requesting or instructing a source 103 to emit a high energy input pulse 14. Passing 512 the high energy input pulse 14 may also include passing a burst of pulses.

Outputting 518 may also include outputting amplified control pulses 16 while waiting for a trigger 20. For example, the low energy control pulses 12, even after amplification may be harmless to a workpiece being micromachined so it is unnecessary to add the additional complexity to block these pulses. However, in some embodiments, the amplified low energy control pulses 16 are blocked or only partially output. For example, a output control 108, a pulse picker or a non-linear wavelength converter may be located after the amplifier 106 reducing or entirely blocking the amplified low energy control pulses 16.

After outputting 518 the higher energy output pulse 18, the method 500 returns to maintaining 504 the amplifier's stored energy 10 in the dynamic equilibrium 30 and waiting to receive a trigger 20. In some embodiments, (including, for example powering on a laser) the method 500 may continuously apply control pulses, and may wait until the amplifier 106's stored energy equilibrium between the upper boundary 24 and the lower boundary 26 is established.

Although FIG. 5 illustrates example blocks of method 500, in some implementations, method 500 may include additional blocks, fewer blocks, different blocks, or differently arranged blocks than those depicted in FIG. 5. Additionally, or alternatively, two or more of the blocks of method 500 may be performed in parallel.

FIG. 6A graphs 600 higher energy output pulses 18 and amplified low energy control pulses 16 for an example laser system 310 where each circle-topped vertical line represents the energy of an amplified pulse. For the first 50 microseconds, the laser system 310 triggers higher energy output pulses 602 at a fixed PRF of 200 kHz (corresponding to 5 microseconds between output pulses) without any control pulses. After 50 microseconds, the triggers become random and control pulses are enabled. After some pre-set time shorter than the regular pulse period of 5 microseconds (for example 2.5 microseconds) the low energy control pulses 604 are sent to the amplifier with a PRF of 2 MHz (0.5 microseconds between pulses) with an appropriately chosen pulse energy. The amplified control pulses 604 have energy levels that are about 10% of the energy of the higher energy output pulse 602 because the 2 MHz PRF of the control pulses is 10× higher than the 200 kHz PRF of the high energy input pulses requested by the triggers.

When the next trigger is received (not illustrated), the control pulses 604 are blocked or turned off, allowing the amplifier's stored energy to recover to a target level, at which a higher energy output pulse identified by point 606 is amplified and outputted. After amplifying pulse 606, the amplifier's stored energy is depleted to a depleted level, so the control pulses are blocked until the amplifier's stored energy recovers to an upper boundary. At point 608 the stored energy reaches the upper boundary, and control pulses begin again. At this point (approximately 80 microseconds), another trigger is received after the first control pulse, the control pulses are stopped, the stored energy rises to the target level again, and a high energy input pulse similar to pulses 602 and 606 is released. This pattern continues with the remaining triggered pulses.

Figure 6B:
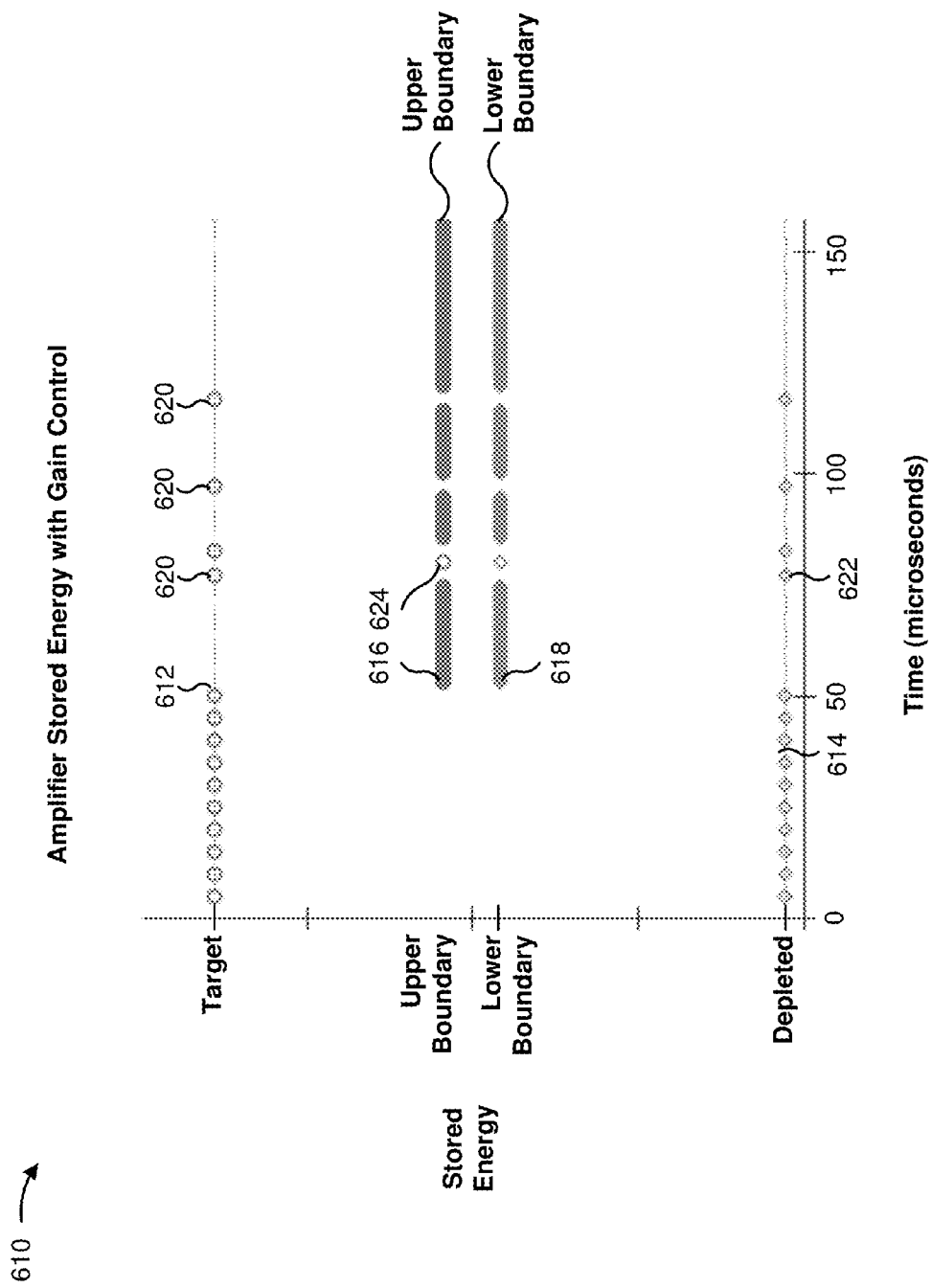
FIG. 6B is a graph showing amplifier stored energy corresponding to FIG. 6A.

FIG. 6B corresponds to FIG. 6A. FIG. 6B is an example graph 610 of transitions of the amplifiers' stored energy instead of continuously tracing the amplifier's store energy as in FIGS. 1 and 2. The transitions of the amplifier's stored energy are associated with generating the output pulses described in FIG. 6A. It can be seen that until t=50 microseconds, the amplifier's stored energy is dynamically stable oscillating between points 612 at the target level immediately before a high energy input pulse enters the amplifier and points 614 at the depleted energy level immediately after that pulse is amplified to a higher energy output pulse. Right after t=50 microseconds, the amplifier's stored energy is allowed to only partially recover, for the pre-set time, to an upper boundary below the target level and then low energy control pulses are launched with a pre-set low energy per pulse and 2 MHz PRF immediately establishing a new dynamic steady-state between points 616 at the upper boundary and points 618 at the lower boundary. When the next trigger is received (not illustrated), the control pulses are blocked or turned off, allowing the amplifier's stored energy to recover to the target level at point 620 during a time shorter than the original pulse period of 5 microseconds, for example 2.5 microseconds. Then the amplifier's stored energy will be at the target level ready to amplify the next high energy input pulse into a higher energy output pulse causing the amplifier's stored energy to deplete to point 622 then elevate to point 624 where control pulses begin again. At this point (approximately t=80 microseconds), another trigger is received after the first control pulse, so the control pulses are stopped, the stored energy rises to the target level again, and a high energy input pulse is released. This pattern continues with the remaining triggered pulses.

Figure 6D:
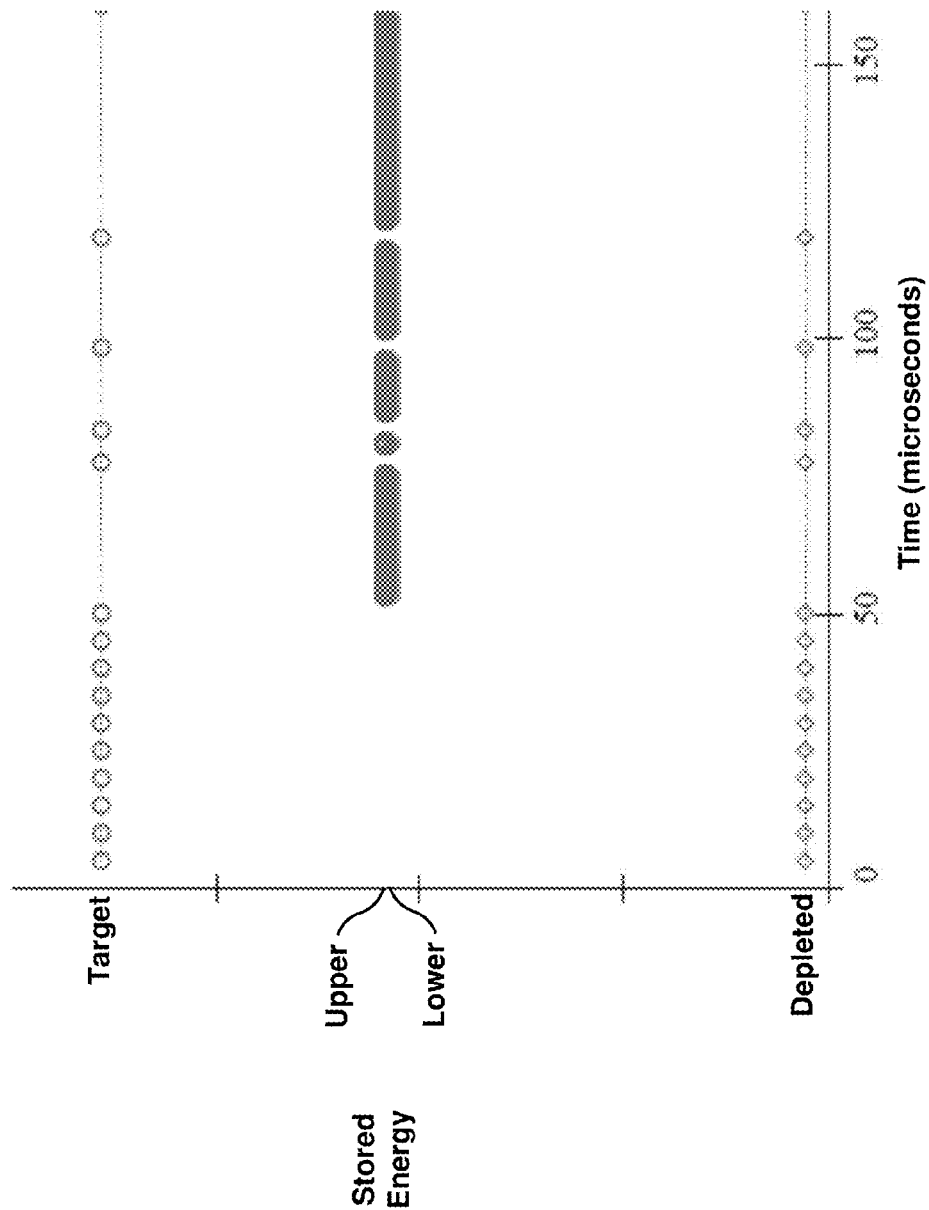
FIG. 6D is a graph showing amplifier stored energy corresponding to FIG. 6C.

FIGS. 6C and 6D are similar to FIGS. 6A and 6B, respectively; however the control pulses are applied with at a 10x faster PRF (20 MHz corresponding to a 10x smaller time spacing of 0.05 microseconds). This requires the energy of the control pulses from the source to be approximately 10 times smaller and establishes a narrower dynamic equilibrium while waiting for triggers. One can also go one step further and use the full repetition rate of the seed oscillator, e.g. 100 MHz. The freeze period will then be a multiple of 10 ns, so the maximum difference in time delay, or the timing jitter, between the triggers and the higher energy output pulses will be 10 ns. Timing jitter as low as 10 ns is unlikely to impact industrial applications and may be considered perfect (or instantaneous) output pulse timing. Accordingly, embodiments of the present disclosure can be said to enable arbitrarily timed triggering of an ultrafast laser with negligible timing jitter of the output pulses, and with virtually no penalty regarding the output pulse stability. The only condition is that there is a minimum temporal separation between any two trigger pulses, i.e. there is a maximum PRF and an associated triggered output pulse energy that can be chosen according to the application needs.

It is noteworthy that there is no transition time between using a laser with high energy pulses at a fixed PRF in dynamic equilibrium between the target and depleted energy levels and enabling control according to the present disclosure establishing a new dynamic equilibrium between the upper and lower boundaries using low energy control pulses at a higher PRF. The amplifier may be held in a dynamic equilibrium at all times until a trigger is received. The energy and the PRF of the control pulses are chosen such that, given the pre-defined upper boundary level, the amplifier is in a new dynamic equilibrium, lower than the target level. This allows dynamic and instantaneous transitions of a laser system between normal fixed PRF operation and trigger based operation. There is no secondary cavity that has to start lasing, i.e. no time delay to go through a laser spiking regime before reaching a new steady-state. There is also no pump power adjustment necessary that would result in increased transition times and/or cause the thermal state of the amplifier gain crystal to depart from its equilibrium.

Returning to FIGS. 6A and 6B, a PRF of 2 MHz was selected for the control pulses. Each control pulse requires a ½ MHz=0.5 microseconds recovery time in order for the amplifier's stored energy to recover to the upper boundary. Therefore, the amplifier's stored energy can be frozen for a time window that will preferably be a multiple of 0.5 microseconds. Compared to an output that has a constant latency time (e.g., delay time) with regard to the trigger, the optical pulse could have a temporal jitter of 0.5 microseconds. In some applications this timing jitter is insignificant. Where 0.5 microseconds is significant, the control pulses may have a higher PRF (as in FIGS. 6C and 6D, to reduce the timing jitter to an acceptable value. The example embodiment of FIGS. 6C and 6D provide a temporal jitter that is reduced to 0.05 microseconds. In other embodiments, when negligible timing jitter is desired and some energy jitter may be acceptable, a high energy input pulse may be released at the time requested, but when the amplifier's stored energy is near, but has not reached, the target level.

FIGS. 6A-6D illustrate example graphs of amplifier stored energy and pulse energy values relating to example method 500 shown in FIG. 5. FIGS. 6A-6D are provided merely as examples. Other examples are possible and may differ from the examples described.

Figure 7:
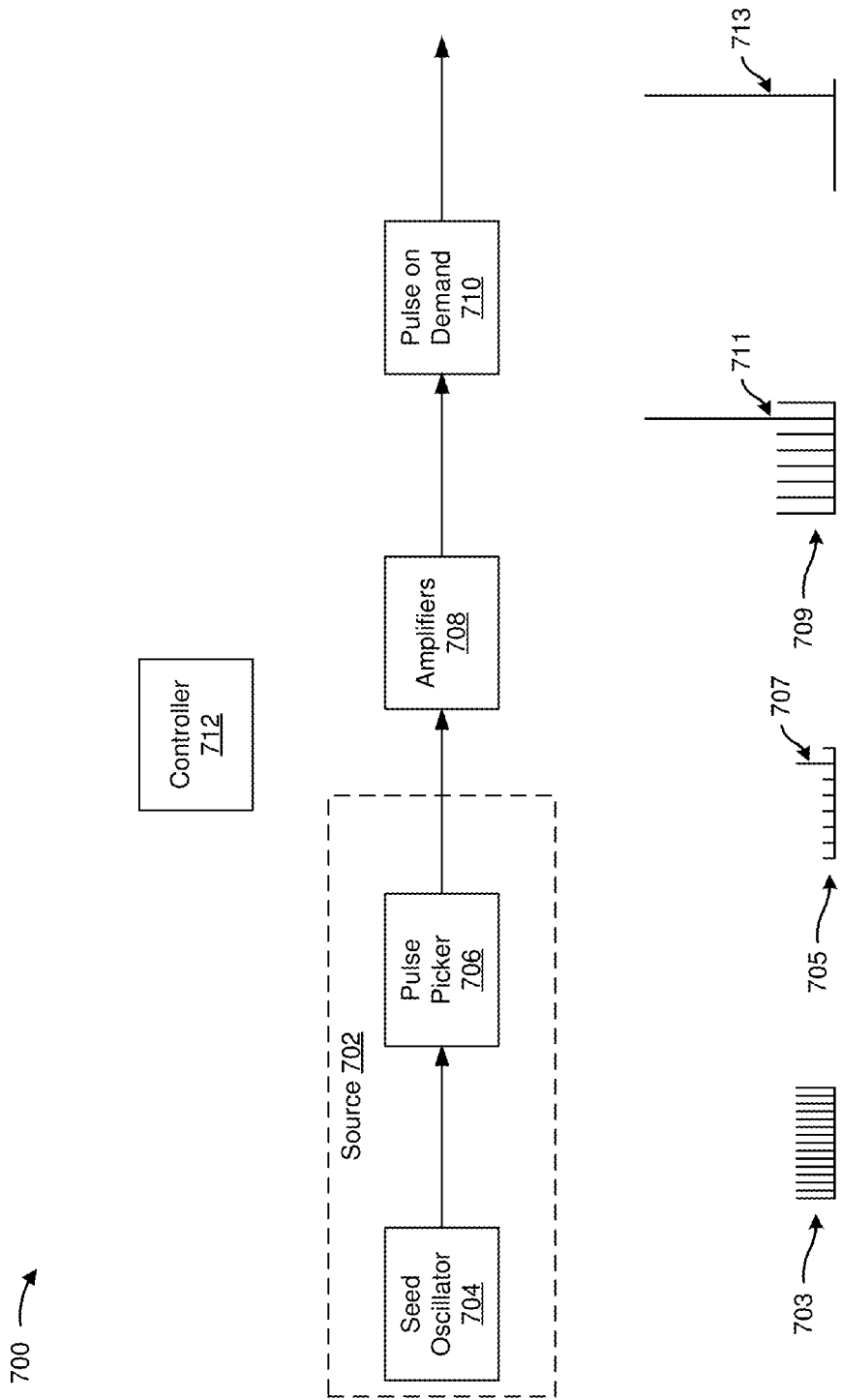
FIG. 7 is a diagram of an example master oscillator power amplifier ultra-fast laser system in which systems and/or methods, described herein, may be implemented.

FIG. 7 illustrates a master oscillator power amplifier ultra-fast laser system 700 where the source 702 comprises a seed oscillator 704 and a pulse picker 706. Pulse generation starts with a seed oscillator 704 that generates low energy (around 1 nJ to 100 nJ) picosecond or femtosecond seed pulses 703, typically in the near IR wavelength region (around 1 micrometer), at a fixed repetition rate (usually in the range of 10-200 MHz). Seed oscillator 704 may include a mode-locked seed oscillator, a pulsed diode laser, a Q-switched laser, a pulsed fiber laser, or other lasers suitable for seeding transient optical amplifiers as known in the art.

The pulse picker 706 receives optical pulses from the seed oscillator 704 and may reduce the repetition rate by picking single pulses, sometimes groups of pulses, called a burst, at a fixed PRF ranging from, for example, 10 kHz to 100 MHz. The pulse picker 706 may be acousto-optic or electro-optic and can preferably pick any sequence of pulses, including non-repetitive sequences, from the seed oscillator 704. The pulse picker 706 can further control the picking efficiency, i.e. the energy of the picked pulses 707 with a sufficiently short response time. In some implementations, the pulse picker 706 may be capable of passing an optical signal at a particular efficiency (e.g., 0.01%, 0.1%, 1%, 10%, 50%, 90%, etc.) with less than 5% relative error. In some implementations, pulse picker 706 may be capable of passing an optical signal at a variable efficiency that can be changed, in some implementations, with a particular response time (for example, microsecond or nanosecond response time). This allows the pulse picker 706 to block seed pulses 703, partially pass seed pulses as low energy control pulses 705, pass seed pulses as high energy input pulses 707 or pass bursts of seed pulses. As possible examples, the control pulses may be passed with energies of approximately 1 picojoule, approximately 0.01 nanojoules, approximately 0.1 nanojoules, approximately 1 nanojoule, approximately 0.01 microjoules, approximately 0.1 microjoules, approximately 2.5 microjoules, or the like, and the high energy input pulses may be passed with energies 4 times higher than the control pulses, 10 times higher than the control pulses, 100 times higher than the control pulses, or the like.

One or more stages of amplifiers 708 receive the control pulses 705 and input pulses 707 passed by the pulse picker 706 out of source 702 and amplify them to amplified control pulses 709 and higher energy output pulses 711, respectively. The amplifiers 708 comprise one or more transient, continuous-wave-pumped amplifiers capable of amplifying an optical signal. The amplifiers 708 may amplify the higher energy output pulses 711 to between approximately 1 microjoule and 1,000 microjoules. At such energy levels per pulse, the higher energy output pulses 711 are capable of causing cold ablation, i.e. the removal of material at low temperatures and therefore high process quality for micromachining. The one or more amplifiers 708 may include one or more pumps. In some implementations, amplifiers 708 may include amplifiers that have single or multiple passes through the amplifier's gain medium.

After the amplifiers 708, the laser 700 optionally includes a Pulse on Demand module (POD) 710 that may be a second pulse picker. The POD 710 is an example of an optional output control 108. The POD 710 allows fast turn on/off of the optical beam, blocking of the amplified control pulses 709 and may allow control to fully pass or decrease the energy level of higher energy output pulses 711 emitted from the laser 700 as output pulses 713.

Controller 712 coordinates pulse picker 706, POD 710 and triggers 20 while managing the amplifier's stored energy. Controller 712 may also control seed oscillator 704 or one or more pumps for the one or more stages of amplifiers 708.

In this manner, embodiments of the present disclosure can take full advantage of the high repetition rate of the seed oscillator 704. The beam of seed pulses 703 is used both for seeding the amplifier with input pulses 707 to generate high energy output pulses 713, as well as providing low energy control pulses 705 to regulate the amplifiers' stored energy as required, and with high temporal resolution. In one embodiment, a single acousto-optic modulator (AOM) is driven by the controller 712 that regulates the energy of every individual seed pulse. This highly dynamic modulation capability permits using a single AOM to control the high energy input pulses 707 as well as the low energy control pulses 705. The latter have a temporal spacing that is shorter, preferably much shorter, than the temporal spacing between consecutive high energy input pulses 707. Because the spacing of the control pulses 705 may be orders of magnitude shorter (e.g. approximately 10 nanoseconds to 1 microsecond) than the upper state lifetime of solid-state gain materials (typically 100 microseconds to 2000 microseconds), a beam of control pulses 705 is seen by the amplifiers 708 as virtually continuous-wave. This enables full control over the gain evolution of the stages of amplifiers 708. The slower response time of the amplifier gain materials also allows substitution of the single high PRF source 702 with a low power continuous wave (cw) source to provide a low average power cw beam instead of a beam of high PRF low energy pulses. Such an alternative embodiment would include a second source or a second laser for the high energy input pulses 707.

Returning to the example embodiment of FIG. 7, since the control pulses 705 have an optical power that is matched to the present gain of the amplifiers 708, the controller 712 has full control to regulate the amplifier's stored energy. This allows removing any gain dynamics. Due to the high seed oscillator repetition rate, the control pulses 705 are available essentially instantaneously (with a temporal spacing that is greater than the response time of the amplifiers 708) as soon as they are needed and with the power that is needed.

Accordingly, embodiments of the present disclosure allow for almost instantaneous freezing of the stored energy of the amplifiers 708 (and thus the gain of the amplifiers 708), for an arbitrary time duration and at any stored energy level. This enables irregular triggering by simply pausing the amplifier's gain evolution (the change of the amplifier's stored energy) for as long as needed, at whatever energy level is desired.

In the example embodiment of FIG. 7, the low energy control pulses preferably have the same optical properties as the high energy input pulses, except for their energy and their timing. Therefore, the control pulses can be used to control a complex amplifier chain containing any number of stages, without adding any complexity. The various stages can even be very different, a first stage may provide a gain of 10000× at low energy, and a second stage may provide a gain of 2× at high energy, they will both be stabilized by the same control pulses as the latter are essentially indistinguishable (by the amplifiers) from the high energy input pulses. A whole chain of amplifiers can constantly be kept in dynamic equilibrium below the target level.

Amplifying control pulses prevents the amplifiers' stored energy from increasing excessively when there are no triggers. However, outputting the amplified control pulses may be undesirable in some applications. In some embodiments, the amplified control pulses may be dumped before they exit the laser system. If there is an output control, such as a POD, it can easily be used to remove amplified control pulses. Another possibility is to make use of the lower (potentially much lower) control pulse energy by relying on some sort of nonlinearity. The application itself may provide this nonlinearity. In micromachining with ultra-short laser pulses, for example, the process of cold ablation has a threshold energy and the amplified control pulses may be below this threshold. In wavelength converted lasers, a nonlinearity can be provided by a wavelength conversion process. By choosing a high control pulse PRF, e.g. 100 times higher than a maximum PRF of triggered, higher energy output pulses, the amplified control pulse energy will be 100 times smaller compared with the higher energy output pulses. Therefore, the amplified control pulses will be converted to higher harmonics wavelengths with negligible efficiency such that the unconverted control pulses can easily be separated from the wavelength-converted output pulses using wavelength filtering.

As illustrated in FIG. 5, method 500 may include receiving a trigger. In some implementations, controller 109 may receive an external trigger. For example, a laser system may receive triggers based on times at which triggered pulses are to be outputted (e.g., in order to maintain a physical spacing of outputted pulses when the beam is moved relative to a work surface (e.g., work surface 330)). In some implementations, the laser system may generate an internal trigger. For example, assume that the laser system outputs pulses at a first PRF. Assume further that the laser system determines to change to a second, lower PRF (e.g., based on a user interaction to cause the first PRF to be changed, based on a voltage applied to an input of the laser system, etc.). In that case, the laser system may generate internal triggers at the second PRF. In some implementations, the laser system may generate internal triggers at a changing PRF, at no particular repetition frequency (e.g., randomly, arbitrarily, irregularly, etc.), based on instructions specific to the application using the laser, based on a computer program associated with the laser system, or the like.

In some implementations, controller 109 may determine that the amplifier's stored energy has been pumped to the target level based on an amount of time. For example, assume that pump 107 pumps the stored energy of amplifier 106 at a particular rate, and assume that each low energy control pulse depletes the stored energy of amplifier 106 to a particular value that is less than the target threshold. In that case, controller 109 may be configured to determine, based on a time at which a most recent control pulse was amplified, that the stored energy satisfies the target threshold. For example, a particular amount of time may pass between a control pulse being amplified and the stored energy being pumped to the target gain threshold, and controller 109 may determine that the particular amount of time has passed since a most recent control pulse was amplified. Additionally, or alternatively, controller 109 may determine that the stored energy has been pumped to the target threshold based on a sensor.

Timing jitter may be referred to as a difference between a minimum and a maximum time delay between receiving a trigger and outputting a higher energy output pulse. The timing jitter for a laser system according to the present disclosure may be equal to an inverse of the high PRF associated with the control pulses. A minimum time delay may occur where the laser system receives a trigger immediately before requesting a control pulse. A maximum time delay may occur where the laser system receives a trigger immediately after requesting a control pulse. Laser 100 can reduce time delay and reduce timing jitter by using higher PRF with lower energy control pulses (for the same average power). Reduced timing jitter may improve accuracy of a micromachining process. As possible examples, timing jitter values may be between approximately 5 nanoseconds and approximately 100 nanoseconds, or may be within a different range of time values.

Thus far, example embodiments have described the application of high-resolution control pulses to regulate the amplifier's stored energy thereby freezing the gain of a transient optical amplifier in order to allow for arbitrarily timed triggering but constant energy output pulses. The underlying principle of controlling the optical gain can also be used to implement pulse energy modulation, that is, instead of keeping the output pulse energy levels constant, embodiments of the present disclosure may be configured to modulation successive output pulses to have higher energy levels, something a POD or pulse picker cannot do.

In some implementations, the laser 100 may use different sets of parameters to regulate amplification of laser pulses. For example, the laser 100 may change from a first PRF to a second PRF (e.g., that is associated with a higher output energy and a lower PRF) or to a third PRF (e.g., that is associated with a lower output energy and a higher PRF), or the like. The first PRF, the second PRF, and the third PRF may each be associated with a respective first time interval and a respective second time interval. The first time intervals may define an amount of time to wait between amplifying a high energy input pulse and resuming amplification of low energy control pulses. The second time intervals may define an amount of time, after a trigger is received and the upper boundary is reached, after which to amplify a high energy input pulse. The laser 100 may switch between the different PRFs by using first time intervals and second time intervals corresponding to the different PRFs. For example, to switch from the first PRF to the second PRF, the laser 100 may stop using a first time interval and a second time interval associated with the first PRF, and may start using a first time interval and a second time interval associated with the second PRF.

Figure 8:
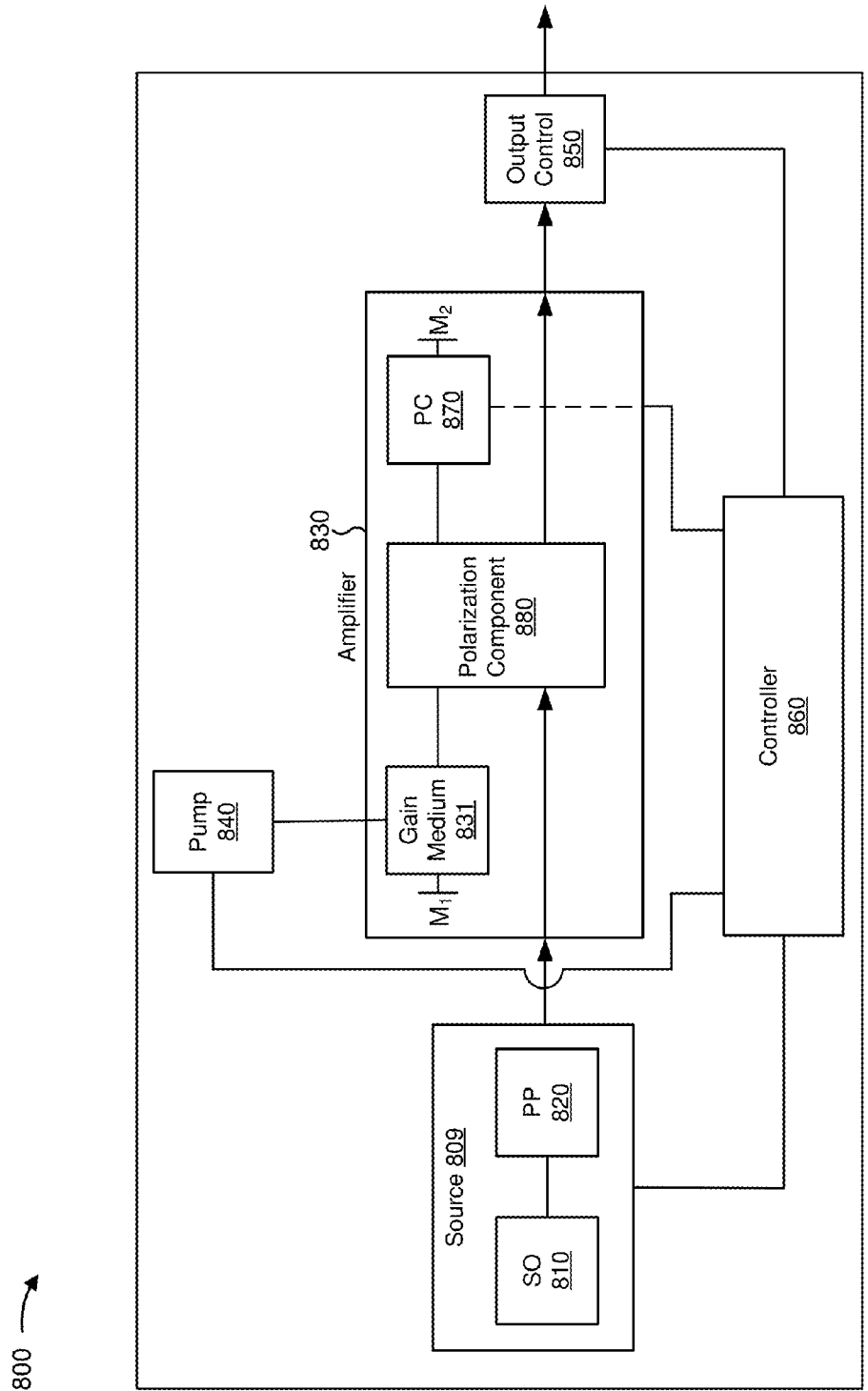
FIG. 8 is a diagram of an example regenerative amplifier laser system in which systems and/or methods, described herein, may be implemented.

FIG. 8 illustrates an example regenerative amplifier laser system 800. Laser system 800 may include a source 809 (comprising, for example, a seed oscillator (SO) 810 and a pulse picker (PP) 820), one or more amplifiers 830, one or more pump sources 840, an output control 850, a controller 860, a Pockels cell (PC) 870, and a polarization component 880. Source 809, seed oscillator 810, pulse picker 820, pump source 840, output control 850, and controller 860 are described in more detail in connection with FIG. 7, above. Amplifier 830 comprises a regenerative amplifier as is well known in the art. Amplifier 830 may include a resonator cavity defined between two mirrors $M_1$ and $M_2$, a gain medium 831, Pockels cell 870, and polarization components 880. Pockels cell 870 may control whether optical signals are passed into and/or out of the resonator cavity by polarization components 880 and/or may control whether the resonator cavity is blocked or unblocked (e.g., closed or open). Pockels cell 870 may include other electro-optic switches or other switches with nanosecond response time that can handle high energy pulses.

In a MOPA laser system, all pulses through the amplifier make the same number of passes because in a multi-pass amplifier, (e.g., as in a MOPA laser system) the quantity of passes is defined by the spatial configuration of the beam path through the amplifier. In a regenerative laser system, controller 860 may cause pulses (e.g., high energy input pulses and low energy control pulses) to make different numbers of passes through the amplifier by controlling the Pockels cell 870. As one possible example, low energy control pulses may only pass one round trip through the gain medium while waiting for a trigger. In some embodiments, this single round trip per control pulse may be sufficient to regulate the amplifier's stored energy. In other embodiments, multiple passes through the regenerative amplifier's gain medium may be required. This can be achieved, for example, by partially passing the control pulses through the Pockels cell 870 such that some of the control pulse in the cavity escapes while some of another control pulse from the source enters the amplifier. Additionally, or alternatively, this can be achieved, for example, by capturing the control pulses for a pre-defined quantity of round trips, in order for energy of the control pulses to become sufficiently high to deplete the stored energy to a desired lower boundary.

The number and arrangement of components shown in FIGS. 7 and 8 are provided as an example. In practice, there may be additional components, fewer components, different components, or differently arranged components than those shown in FIGS. 7 and 8. For example, laser system 800 may include one or more Faraday rotators, one or more wave plates (e.g., between pulse picker 820 and polarization component 880, between Pockels cell 870 and polarization component 880, etc.), output control 850, one or more additional polarization components 880, or the like.

Furthermore, two or more components shown in FIGS. 7 and 8 may be implemented within a single device. Additionally, or alternatively, a set of components (e.g., one or more components) of laser systems 700 and 800 may perform one or more functions described as being performed by another set of components of laser systems 700 and 800, respectively.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    continuously pumping a transient optical amplifier thereby increasing the amplifier's stored energy, the amplifier's stored energy associated with three increasing energy levels:
        a lower boundary of a dynamic equilibrium;
        an upper boundary of the dynamic equilibrium; and
        a target level defining stored energy for amplifying a high energy input pulse to a higher energy output pulse;
    maintaining the amplifier's stored energy in the dynamic equilibrium by passing low energy control pulses from a source to the amplifier at a high repetition frequency; and
    based on receiving a trigger:
        stopping passing low energy control pulses to the amplifier,
        waiting for the pumping to increase the amplifier's stored energy to the target level,
        passing the high energy input pulse to the amplifier,
        amplifying the high energy input pulse to a higher energy output pulse thereby decreasing the amplifier's stored energy to a depleted level, below the target level, and
        outputting the higher energy output pulse.

2. The method of claim 1, wherein the source comprises a short pulse laser source having a pulse repetition frequency greater than 5 megahertz (MHz); and a pulse picker, optically connected to the short pulse laser source, to control emission and energy of laser pulses from the short pulse laser source.

3. The method of claim 2, where controlling the emission and energy of the laser pulses comprises:
   passing, partially passing or blocking, by the pulse picker, laser pulses from the short pulse laser source.

4. The method of claim 2, where stopping passing the low energy control pulses comprises:
   blocking, by the pulse picker, laser pulses from the short pulse laser source.

5. The method of claim 2, where at least one of the short pulse laser source or the pulse picker provide sub-microsecond response time.

6. The method of claim 1, where the low energy control pulses, the high energy input pulse, and the higher energy output pulse have pulse widths less than one microsecond.

7. The method of claim 1, where the depleted level is lower than the lower boundary of the dynamic equilibrium.

8. The method of claim 1, where a center energy level of the dynamic equilibrium is closer to a center energy level of the target level and the depleted level than to the target level or to the depleted level.

9. The method of claim 1, where a time delay between receiving the trigger and outputting the higher energy output pulse is between approximately 5 nanoseconds and approximately 100 nanoseconds.

10. A device, comprising:
   a transient optical amplifier having stored energy associated with three increasing energy levels:
     a lower boundary of a dynamic equilibrium;
     an upper boundary of the dynamic equilibrium; and
     a target level defining stored energy for amplifying a high energy input pulse to a higher energy output pulse;
   a pump to increase the amplifier's stored energy;
   a source to pass low energy control pulses or the high energy input pulse to the amplifier; and
   a controller configured to:
     maintain the amplifier's stored energy in the dynamic equilibrium by requesting the source pass low energy control pulses to the amplifier at a high repetition frequency;
     wait to receive a trigger; and
     based on receiving the trigger:
       stop passing low energy control pulses to the amplifier, and
       request the source pass the high energy input pulse to the amplifier when the amplifier's stored energy reaches the target level.

11. The device of claim 10, where the source comprises a laser diode.

12. The device of claim 11, where the controller, when stopping passing the low energy control pulses, is configured to:
   control the laser diode to prevent emission of pulses by the laser diode.

13. The device of claim 10, where the source comprises a continuous wave laser providing the low energy control pulses as a continuous wave low average power control beam and a second laser providing the high energy input pulse.

14. The device of claim 10, where the amplifier's stored energy is depleted to a depleted level by amplification of the high energy input pulse; and
   where the high repetition frequency is greater than a repetition frequency that would maintain the amplifier's stored energy in equilibrium between the target level and the depleted level without the low energy control pulses.

15. The device of claim 14, wherein a difference between the upper boundary and the lower boundary is less than or equal to 60 percent of a difference between the target level and the depleted level.

16. The device of claim 14, wherein a difference between the upper boundary and the lower boundary is less than or equal to 20 percent of a difference between the target level and the depleted level.

17. The device of claim 16, further comprising outputting the higher energy output pulse; and
   where decreasing the difference between the upper boundary and the lower boundary decreases at least one of:
     a timing jitter between a time of outputting the higher energy output pulse and a time of receiving the trigger, or
     an energy jitter between a desired energy level and an energy level of the higher energy output pulse.

18. The device of claim 10, where the amplifier comprises at least one of:
   one or more single pass amplifiers,
   one or more multi-pass amplifiers, or
   a combination of one or more single pass amplifiers and one or more multi-pass amplifiers.

19. The device of claim 10, where the controller is to:
   determine that the trigger indicates to provide a series of pulses in a burst; and
   request, when the amplifier's stored energy reaches the target level, the high energy input pulse as the series of pulses in a burst.

20. The device of claim 10, further comprising an output control, after the amplifier, to pass, block, or reduce energy levels of amplified low energy control pulses and higher energy output pulses before output.

21. The device of claim 20, where the controller is configured to request the output control to block pulses when the controller is requesting low energy pulses from the source.

22. The device of claim 20, where the output control comprises a pulse picker or a pulse-on-demand.

23. The device of claim 10, further comprising a nonlinear wavelength converter after the amplifier.

24. The device of claim 10, where the device receives multiple triggers and outputs multiple higher energy output pulses corresponding to the multiple triggers; and
   where a timing jitter and an energy jitter of the multiple higher energy output pulses corresponding to the multiple triggers are less than approximately 1 microsecond and 5%, respectively.

25. A short pulse laser gain regulation method comprising:
   pumping, by a laser system, a transient optical amplifier of the laser system, thereby increasing the amplifier's stored energy;
   waiting, by the laser system, to receive a trigger;
   while the amplifier's stored energy is below a holding energy level, preventing, by the laser system, emission of laser pulses from a pulse source of the laser system into the amplifier;
   when the amplifier's stored energy reaches the holding energy level and the trigger has not been received, emitting, by the laser system, low energy control pulses from the pulse source into the amplifier, each low energy pulse decreasing some of the amplifier's stored energy, counteracting the pumping, thereby maintaining the amplifier's stored energy in a dynamic equilibrium near and below the holding energy level;

when the trigger is received, preventing, by the laser system, emission of laser pulses from the pulse source into the amplifier until the amplifier's stored energy reaches a target energy level higher than the holding energy level, then emitting a high energy input pulse from the pulse source into the amplifier, amplifying the high energy input pulse in the amplifier to a higher energy output pulse; and outputting, by the laser system, the higher energy output pulse.

26. The method of claim 25, where the trigger is received externally from or generated internally to a controller of the laser system at any arbitrary time.

27. The method of claim 25, where, prior to amplification, each low energy control pulse, of the low energy control pulses, comprises 25%, or respectively less, energy than the high energy input pulse; and a repetition rate of the low energy control pulses is 4×, or respectively more, than a pulse repetition frequency (PRF) that would maintain the amplifier's stored energy in equilibrium between the target energy level and a depleted level without the low energy control pulses, the amplifier's stored energy being depleted to the depleted level by amplification of the high energy input pulse.

28. The method of claim 25, where, prior to amplification, each low energy control pulse, of the low energy control pulses, comprises between approximately 0.1% and approximately 40% of the energy of the high energy input pulse.

29. The method of claim 25, where each low energy control pulse, of the low energy control pulses, comprises between approximately 0.001 nanojoules and approximately 100 nanojoules of energy.

30. The method of claim 25, where the low energy control pulses have the same optical properties as the high energy input pulse except for energy and timing.

31. The method of claim 25, where the high energy input pulse travels through a gain medium of the amplifier multiple times before being output as the higher energy output pulse.

32. The method of claim 25, where a time delay between receiving the trigger and outputting the higher output energy pulse is less than approximately 1 microsecond.

33. The method of claim 25, where the laser system comprises one of:
 a nanosecond laser,
 a picosecond laser,
 a femtosecond laser,
 a master oscillator power amplifier laser, or
 a regenerative amplifier laser.

\* \* \* \* \*